(12) United States Patent
Kakande

(10) Patent No.: US 10,164,710 B2
(45) Date of Patent: Dec. 25, 2018

(54) OPTICAL TRANSCEIVER FOR SECURE DATA TRANSMISSION

(71) Applicant: Alcatel-Lucent USA Inc., Murray Hill, NJ (US)

(72) Inventor: Joseph K. Kakande, Jersey City, NJ (US)

(73) Assignee: NOKIA OF AMERICA CORPORATION, Murry Hill, NJ (US)

(*) Notice: Subject to any disclaimer, the term of this patent is extended or adjusted under 35 U.S.C. 154(b) by 0 days.

(21) Appl. No.: 15/332,810

(22) Filed: Oct. 24, 2016

(65) Prior Publication Data

US 2018/0115366 A1 Apr. 26, 2018

(51) Int. Cl.
| | |
|---|---|
| *H04B 10/25* | (2013.01) |
| *H04J 14/04* | (2006.01) |
| *H04B 10/2581* | (2013.01) |
| *H04L 29/06* | (2006.01) |
| *H04B 10/572* | (2013.01) |
| *H04B 10/40* | (2013.01) |

(52) U.S. Cl.
CPC ..... *H04B 10/2504* (2013.01); *H04B 10/2581* (2013.01); *H04B 10/40* (2013.01); *H04B 10/572* (2013.01); *H04J 14/04* (2013.01); *H04L 63/0428* (2013.01); *H04L 63/062* (2013.01)

(58) Field of Classification Search
CPC .. H04B 10/2504; H04B 10/40; H04B 10/572; H04B 10/2581; H04L 63/0428; H04L 63/062; H04J 14/04
See application file for complete search history.

(56) References Cited

U.S. PATENT DOCUMENTS

| | | |
|---|---|---|
| 7,174,067 B2 | 2/2007 | Murshid et al. |
| 7,248,695 B1 | 7/2007 | Beal et al. |

(Continued)

OTHER PUBLICATIONS

"Proteus-S: Standard mode-selective spatial multiplexer for optical telecommunications," Data Sheet, www.cailabs.com, Sep. 2017 [retrieved on Mar. 14, 2018] Retrieved from the Internet: <URL: http://www.cailabs.com/wp-content/uploads/2017/09/CAILabs_PROTEUS-S_Specs_EN_201709.pdf> (1 page).

(Continued)

*Primary Examiner* — Leslie C Pascal
(74) *Attorney, Agent, or Firm* — Mendelsohn Dunleavy, P.C.; Yuri Gruzdkov

(57) ABSTRACT

We disclose a multichannel optical transceiver having a first optical channel used for client-data transmission over an optical fiber and a second optical channel that enables secure transport of encryption keys over the same optical fiber. In an example embodiment, the first channel uses a first carrier wavelength at which the optical fiber supports a single guided mode. The second channel uses a second carrier wavelength at which the optical fiber supports multiple guided modes. The secure transport of encryption keys can be achieved, e.g., by scrambling the encryption-key data over multiple space-division-multiplexed optical signals transmitted by way of the multiple guided modes. The securely transported encryption keys can then be used to enable the client data transmitted using the first optical channel to be encrypted to frustrate or prevent eavesdropping along the fiber length.

13 Claims, 2 Drawing Sheets

(56) References Cited

U.S. PATENT DOCUMENTS

| | | | |
|---|---|---|---|
| 7,639,909 | B2 | 12/2009 | Murshid et al. |
| 8,320,769 | B2 | 11/2012 | Essiambre et al. |
| 8,355,638 | B2 | 1/2013 | Essiambre et al. |
| 9,008,507 | B2 | 4/2015 | Winzer |
| 2007/0160201 | A1 | 7/2007 | Blom et al. |
| 2008/0270785 | A1 | 10/2008 | Loprieno et al. |
| 2009/0316910 | A1 | 12/2009 | Maeda et al. |
| 2010/0329693 | A1 | 12/2010 | Chen |
| 2014/0186033 | A1 | 7/2014 | Winzer et al. |
| 2015/0256257 | A1 | 9/2015 | Winzer |
| 2015/0309249 | A1 | 10/2015 | Murshid et al. |
| 2016/0233959 | A1 | 8/2016 | Murshid et al. |
| 2016/0233964 | A1* | 8/2016 | Frohlich ............... H04B 10/85 |

OTHER PUBLICATIONS

"Proteus-C: Mode selective Spatial Multiplexer for optical telecommunications," Data Sheet, www.cailabs.com, Oct. 15, 2016, [retrieved on Mar. 14, 2018] Retrieved from the Internet: <URL: http://www.cailabs.com/wp-content/uploads/2017/01/CAILabs_PS_PROTEUS-C-15_oct2016.pdf> (2 pages).

"Coarse Wavelength Division Multiplexer/Demultiplexer (CWDM) Module," Data Sheet, www.lumentum.com, 2015 [retrieved on Mar. 14, 2018] Retrieved from the Internet: <URL: https://www.lumentum.com/sites/default/files/technical-library-items/cwdm_ds_cms_tm_ae.pdf> (4 pages).

"40 Channels C21-C60 Dual Fiber DWDM Mux Demux + Monitor Port," Data Sheet, www.FS.com; [retrieved on Mar. 14, 2018] Retrieved from the Internet: <URL: https://www.fs.com/file/datasheet/40ch-dwdm-mux-demux-c21-c60-with-mon.pdf> (6 pages).

"M3 Modal Mux/Demux", Date Sheet, http://kylia.com, Feb. 3, 2015 [retrieved on Mar. 14, 2018] Retrieved from the Internet: <URL: http://kylia.com/kylia/wp-content/uploads/2015/02/datasheet-MX-v2.0.pdf (5 pages).

Ryf, R., et al., "Low-loss mode coupler for mode-multiplexed transmission in few-mode fiber," Optical Fiber Communication Conference and Exposition (OFC/NFOEC), and the National Fiber Optic Engineers Conference. IEEE, 2012, pp. 1-3.

"1310/CWDM MUX/DEMUX Plug-in Module," Data Sheet, www.finisar.com, Mar. 2015 [retrieved on Mar. 14, 2018] Retrieved from the Internet: <URL: https://www.finisar.com/sites/default/files/downloads/1310_cwdm_mux_demux_plug-in_module_product_specification_rev_e.pdf> (2 pages).

"Fiber Space (De)Multiplexer based on Photonic Lantern," Technical Brief #8, www.phoenixphotonics.com, 2014, [retrieved on Mar. 14, 2018] Retrieved from the Internet: <URL: http://www.phoenixphotonics.com/website/technology/documents/PhotonicLantern0414_v1.pdf> (6 pages).

Velázquez-Benitez, A. M., et al. "Scaling the fabrication of higher order photonic lanterns using microstructured preforms." European Conference on Optical Communication (ECOC), IEEE, 2015, (3 pages).

"Delivering Comprehensive Enterprise DCC Security—Data Center Connect Security—A comprehensive approach to preventing, detecting and mitigating data security risks," www.tmcnet.com, year [retrieved on Aug. 22, 2016] Retrieved from the Internet: <URL: http://www.tmcnet.com/redir?u=1006023> (11 pages).

Birks, T. A., et al., "The Photonic Lantern," Advances in Optics and Photonics vol. 7, No. 2, 2015, pp. 107-167.

Dean, Thomas, et al., "Physical-Layer Cryptography Through Massive MIMO," IEEE Information Theory Workshop (ITW), 2013 (5 pages).

Guan, Kyle, et al., "Secrecy Capacities in Space-Division Multiplexed Fiber Optic Communication Systems," IEEE Transactions on Information Forensics and Security, 2015, vol. 10, No. 7, pp. 1325-1335.

Jung, Yongmin, et al., "Comparative Study of the Effective Single Mode Operational Bandwidth in Sub-wavelength Optical Wires and Conventional Single-Mode Fibers," Optics Express, 2009, vol. 17, No. 19, pp. 16619-16624.

Melati, Daniele, et al., "Reconfigurable Photonic Integrated Mode (de)multiplexer for SDM Fiber Transmission," Optics Express, 2016, vol. 24, No. 12, pp. 12625-12634.

Ryf, R., et al., "Mode-Multiplexed Transmission over Conventional Graded-Index Multimode Fibers," Optics Express, 2015, vol. 23, No. 1, pp. 235-246.

* cited by examiner

100

OPTICAL TRANSCEIVER FOR SECURE DATA TRANSMISSION

BACKGROUND

Field

The present disclosure relates to optical communication equipment and, more specifically but not exclusively, to optical transmitters and receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Communication security is generally directed at achieving two main objectives: system reliability and message secrecy. Good system reliability implies that a message, encoded for transmission and transmitted over the corresponding communication channel, is reliably received at the intended destination (legitimate receiver). An "enemy" of the system reliability is referred to as a jammer. The typical purpose of a jammer is to disrupt the process of communication by increasing the legitimate receiver's bit-error rate (BER), preferably to such an extent that it causes a complete channel outage. Message secrecy implies that only the legitimate receiver, and nobody else, can receive a secret message. An "enemy" of the message secrecy is referred to as an eavesdropper. The typical purpose of an eavesdropper is to covertly "listen" to the transmission and try to understand the secret messages that are being transmitted.

In general, communication security can be addressed at various layers of the Open Systems Interconnection (OSI) reference model. However, some of the most difficult-to-deal-with security attacks can be perpetrated at the physical layer. Consequently, effective approaches that address the issues of communication security at the physical layer are currently needed.

SUMMARY OF SOME SPECIFIC EMBODIMENTS

Disclosed herein are various embodiments of a multichannel optical transceiver having a first optical channel used for client-data transmission over an optical fiber and a second optical channel that enables secure transport of encryption keys over the same optical fiber. In an example embodiment, the first channel uses a first carrier wavelength at which the optical fiber supports a single guided mode. The second channel uses a second carrier wavelength at which the optical fiber supports multiple guided modes. The secure transport of encryption keys can be achieved, e.g., by scrambling the encryption-key data over multiple space-division-multiplexed optical signals transmitted by way of the multiple guided modes at the second carrier wavelength. The securely transported encryption keys can then be used to enable the client data transmitted using the first optical channel to be encrypted to frustrate or prevent eavesdropping along the fiber length.

In some embodiments, the second optical cannel can be designed to enable the second carrier wavelength to be tunable in a manner that changes the number of guided modes supported by the optical fiber at the second carrier wavelength. This feature can beneficially be used, e.g., to appropriately adjust the security level of the encryption-key transport for different applications.

Various embodiments disclosed herein can potentially provide significant capital expense (CAPEX) savings to optical-network operators by reusing the existing fiber infrastructure for the deployment of secure encryption-key transport channels.

According to one embodiment, provided is an apparatus comprising: an optical transmitter or receiver configured to be optically coupled to an optical fiber, and further configured to transmit or receive optical signals having a first carrier wavelength at which the optical fiber supports a single guided mode; an optical transceiver configured to be optically coupled to the optical fiber to transmit and receive optical signals having a second carrier wavelength at which the optical fiber supports a first plurality of guided modes; and an optical multiplexer configured to optically couple the optical transceiver and the optical transmitter or receiver to the optical fiber in a manner that enables the optical transceiver to transmit and receive different modulated optical signals having the second carrier wavelength by way of different respective guided modes of the optical fiber, and further enables the optical transmitter or receiver to transmit or receive the optical signals having the first carrier wavelength by way of the single guided mode of the optical fiber.

According to another embodiment, provided is an apparatus comprising: a first optical transceiver configured to be optically coupled to an optical fiber, and further configured to transmit and receive optical signals having a first carrier wavelength at which the optical fiber supports a first number of guided modes, the first number being greater than one; a second optical transceiver configured to be optically coupled to the optical fiber to transmit and receive optical signals having a second carrier wavelength at which the optical fiber supports a second number of guided modes, the second number being greater than the first number; an optical multiplexer configured to optically couple the first optical transceiver and the second optical transceiver to the optical fiber in a manner that enables the first optical transceiver to transmit and receive different modulated optical signals having the first carrier wavelength by way of different respective guided modes of the optical fiber corresponding to the first wavelength, and further enables the second optical transceiver to transmit and receive different modulated optical signals having the second carrier wavelength by way of different respective guided modes of the optical fiber corresponding to the first wavelength; and a key-management appliance operatively connected to the second optical transceiver to cause the second optical transceiver to transmit and receive encryption keys using the different modulated optical signals having the second carrier wavelength. The first optical transceiver comprises an encryption circuit operatively coupled to the key-management appliance to receive therefrom the encryption keys and configured to: cause the optical signals transmitted by the first optical transceiver to carry a set of encrypted messages, each of the encrypted messages being encrypted using one or more of the encryption keys received from the key-management appliance; and use one or more of the encryption keys received from the key-management appliance to decrypt a set of encrypted messages carried by the optical signals received by the optical transmitter or receiver.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
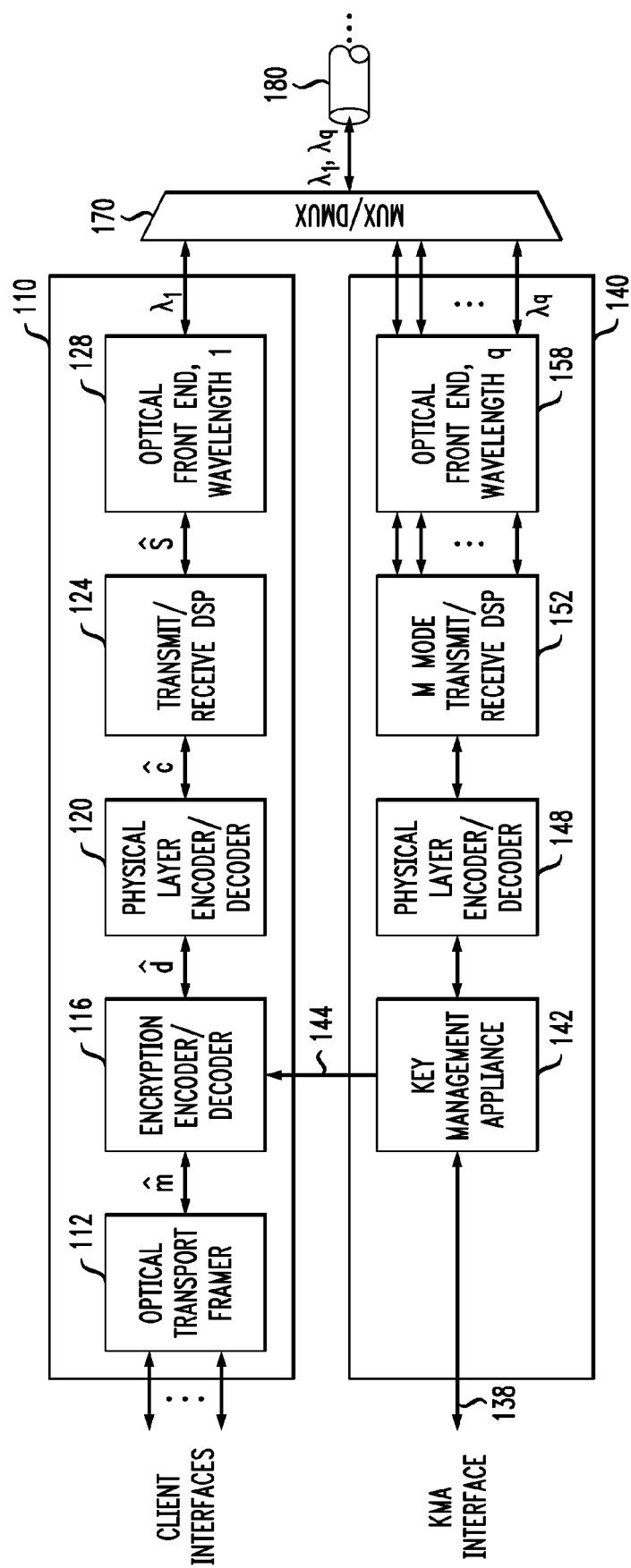
FIG. 1 shows a block diagram of a multichannel optical transceiver according to an embodiment.

A multimode fiber can provide a higher transmission capacity than a single-mode fiber, e.g., by means of space-division multiplexing (SDM). More specifically, different guided modes of a multimode fiber can be populated with different modulated optical signals or different linear combinations of a given set of independently modulated optical signals. The original data can then be recovered at the receiver by appropriately de-multiplexing and de-convolving the resulting received optical SDM signal. Advantageously, space-division multiplexing can be used to complement other multiplexing techniques, such as time-division multiplexing, wavelength-division multiplexing, orthogonal frequency-division multiplexing, and polarization-division multiplexing.

For a given wavelength $\lambda$, an optical fiber can support multiple guided modes if the normalized frequency parameter V (also referred to as the V number) is greater than about 2.405. Eq. (1) gives the expression for V:

$$V = \frac{2\pi a}{\lambda} NA \quad (1)$$

where $a$ is the fiber-core radius, and NA is the numerical aperture. For a step-index fiber, the numerical aperture is given by Eq. (2):

$$NA = \sqrt{n_1^2 - n_2^2} \quad (2)$$

where $n_1$ is the refractive index of the fiber core, and $n_2$ is the refractive index of the fiber cladding.

The guided modes of the fiber can generally be classified as (i) transverse electric (TE) modes, for which the axial component of the electric field is zero; (ii) transverse magnetic (TM) modes, for which the axial component of the magnetic field is zero; and (iii) HE or EH modes, for which neither the axial component of the electric field nor the axial component of the magnetic field is zero. The designation of HE or EH depends on which of the electric (E) and magnetic (H) field components is dominant.

The refractive-index profiles of most step-index optical fibers used in optical communications links have a relatively small (e.g., smaller than about 0.05) contrast $\Delta$, which makes these fibers only weakly guiding. Eq. (3) gives the definition of $\Delta$ for a step-index fiber:

$$\Delta = \frac{n_1 - n_2}{n_1} \quad (3)$$

In the approximation of weak guidance for generally cylindrical fibers, the TE, TM, HE, and EH guided modes become the modes that are conventionally referred to as the linearly polarized (LP) modes.

The following notation is usually adhered to in the description of the LP modes. Each LP mode is designated using two integer indices, e.g., in the form of subscripts: $LP_{jk}$. The first integer index (j) gives the number of $2\pi$-sized phase increments in the electric field per one azimuthal rotation about the fiber axis (e.g., the Z-coordinate axis). The second integer index (k) gives the number of electric-field nodes in the radial dimension, with the zero field at the outer edge of the electric-field distribution also counted as a radial node. Some of the LP modes are additionally given a designating letter, such as a, b, etc. The letter follows the two integer indices and is used to distinguish certain degenerate modes. In addition, each LP mode can have two different polarizations, e.g., an X polarization and a Y polarization, where X and Y are the two transverse (i.e., orthogonal to the fiber axis) coordinate axes.

Representative intensity and electric-field distributions of several low-order LP modes are graphically shown, e.g., in U.S. Pat. No. 8,705,913, which is incorporated herein by reference in its entirety.

For example, the fundamental LP mode ($LP_{01}$) has an intensity profile that is similar to that of a Gaussian beam. The $LP_{01}$ mode corresponds to the $HE_{11}$ mode of a strongly guiding fiber.

The next lowest-order LP mode ($LP_{11}$) has an intensity profile comprising two intensity peaks characterized by a phase difference of 180 degrees between the corresponding electric fields. In the $LP_{11a}$ mode, the intensity peaks are lined up along the X-axis. In the $LP_{11b}$ mode, the intensity peaks are similarly lined up along the Y-axis. The $LP_{11a}$ and $LP_{11b}$ modes correspond to different linear combinations of the $TE_{01}$, $TM_{01}$, and $HE_{21}$ modes of a strongly guiding fiber. If the V number (see Eq. (1)) is in the range between about 2.405 and about 3.9, then the $LP_{01}$, $LP_{11a}$, and $LP_{11b}$ modes are typically the only guided modes supported by the fiber.

The number of supported LP modes further increases, typically in a stepwise manner, with an increase of the V number. As indicated by Eq. (1), the V number can increase with an increase of the fiber-core radius, an increase of the numerical aperture, and/or a decrease of the wavelength $\lambda$. For a given (e.g., already installed) optical fiber, the fiber-core radius and the numerical aperture are fixed constants. In this situation, the V number can still be changed by changing the wavelength $\lambda$ of the optical signal. Due to the number of supported LP modes being a stepped function of the V number, the optical spectrum can be divided into a plurality of spectral bands such that, within each particular spectral band of the plurality, the number of supported LP modes is a respective constant that does not depend on the wavelength $\lambda$ within that spectral band.

For example, a given fiber is a single-mode fiber for any wavelength $\lambda$ that satisfies the following inequality:

$$\lambda > \frac{2\pi a}{2.405} NA \quad (4)$$

As such, Eq. (4) defines a spectral band within which the number of supported LP modes is one, regardless of the wavelength $\lambda$ within that spectral band. The supported guided mode is the fundamental mode $LP_{01}$.

The same fiber is a three-mode fiber for any wavelength $\lambda$ that satisfies the following inequality:

$$\frac{2\pi a}{3.9} NA < \lambda < \frac{2\pi a}{2.405} NA \quad (5)$$

The supported guided modes are the $LP_{01}$, $LP_{11a}$, and $LP_{11b}$ modes. As such, Eq. (5) defines a next spectral band of the plurality, within which the number of supported LP modes is three, regardless of the wavelength λ within that spectral band, and so on.

FIG. 1 shows a block diagram of a multichannel optical transceiver 100 according to an embodiment. A first channel of multichannel optical transceiver 100 is represented by an optical transceiver 110 that uses a first carrier wavelength ($\lambda_1$). A second channel of optical transceiver 100 is represented by an optical transceiver 140 that uses a different carrier wavelength ($\lambda_q$). An optical multiplexer/de-multiplexer (MUX/DMUX) 170 operates to appropriately couple optical transceivers 110 and 140 to an optical fiber 180 that connects multichannel optical transceiver 100 to one or more remote optical transceivers (not explicitly shown in FIG. 1).

In an example embodiment, optical transceiver 140 operates to: (i) securely exchange encryption keys, by way of optical fiber 180, with one or more remote optical transceivers; and (ii) provide encryption keys, e.g., by way of a control signal 144, to optical transceiver 110. Optical transceiver 110 uses the provided encryption keys to: (i) encrypt client data received through various client interfaces from the corresponding client devices for transmission over optical fiber 180; and (ii) decrypt encrypted client data received through optical fiber 180 from the one or more remote optical transceivers.

The carrier wavelength $\lambda_q$ used by optical transceiver 140 is selected such that, at this wavelength, optical fiber 180 supports a desired number M of guided (e.g., LP) modes, where M is an integer greater than one. The carrier wavelength $\lambda_q$ can be changed (tuned) as appropriate or necessary to arrive at such a desired number M. As indicated above, the number M can be increased by decreasing the carrier wavelength $\lambda_q$ or decreased by increasing the carrier wavelength $\lambda_q$ (see, e.g., Eqs. (1) and (4)-(5)).

Optical transceiver 140 can implement secure transmission of encryption keys to a corresponding remote optical transceiver, e.g., by (i) decomposing the data stream carrying the encryption keys into M parallel sub-streams and (ii) transmitting each of the M parallel sub-streams using a respective one of the M guided modes of optical fiber 180 at the carrier wavelength $\lambda_q$. Optical transceiver 140 can implement secure reception of encryption keys from a corresponding remote optical transceiver by performing an inverse transformation, e.g., by (i) de-convolving the M signals received via the M guided modes of optical fiber 180 at the carrier wavelength $\lambda_q$ to recover the corresponding M parallel sub-streams transmitted by the remote optical transceiver and (ii) reconstructing the data stream carrying the encryption keys by combining the M recovered parallel sub-streams.

This encryption-key exchange scheme does not provide absolute security, but rather, makes it computationally hard (e.g., unreasonably long or not algorithmically/technically feasible) for the eavesdropper to extract the encryption keys from the SDM optical signals tapped or diverted from optical fiber 180. The computational complexity to the eavesdropper generally increases with an increase of M. However, the cost of optical transceiver 100 also tends to increase with an increase of the maximum supported value of M. In practice, the maximum supported value of M for optical transceiver 140 can be selected such that this value of M can still make the encryption-key extraction sufficiently computationally difficult for the eavesdropper while not making optical transceiver 100 too expensive for the network operator.

Example methods and apparatus that can be used to enable optical transceiver 140 to implement the above-outlined encryption-key exchange scheme are disclosed, e.g., in U.S. Pat. No. 9,008,507 and U.S. Patent Application Publications Nos. 2014/0186033 and 2015/0256257, all of which are incorporated herein by reference in their entirety. Some embodiments of optical transceiver 140 can benefit from the use of the multiple-input/multiple-output (MIMO) methods disclosed in the following publications: (1) Dean, T., Goldsmith, A., "Physical-layer cryptography through massive MIMO," 2013 IEEE Information Theory Workshop (ITW), pp. 1-5, September 2013; and (2) Guan, K., et al., "Secrecy Capacities in Space-Division Multiplexed Fiber Optic Communication Systems," IEEE Transactions on Information Forensics and Security, vol. 10, no. 7, pp. 1325-1335, July 2015, both of which are also incorporated herein by reference in their entirety.

In an example embodiment, optical transceiver 140 includes a key-management appliance (KMA) 142 that operates to provide encryption keys, by way of a control signal 144, to optical transceiver 110. The encryption keys can typically originate from several possible sources, such as: (i) be generated locally by key-management appliance 142 itself; (ii) be received by key-management appliance 142 through a KMA interface 138 from a corresponding external (e.g., network) encryption authority; (iii) be received by optical transceiver 140 through optical fiber 180 from a corresponding remote optical transceiver, etc. Key-management appliance 142 typically runs a preset key-distribution protocol that is compatible with a suitable embodiment of the above-outlined encryption-key exchange scheme to drive an exchange of encryption keys with a compatible key-management appliance (e.g., a nominal copy of key-management appliance 142) residing at the remote optical transceiver.

In an example embodiment, optical transceiver 140 also includes a physical-layer (PL) encoder/decoder 148, a transmit/receive digital signal processor (DSP) 152, and an optical front-end module 158.

PL encoder/decoder 148 operates to apply a suitable forward-error-correction (FEC) code, e.g., as known in the art, to protect the encryption-key data from possible errors that can be caused by optical-signal impairments imposed by the optical communication link that includes optical fiber 180. In the transmit direction, PL encoder/decoder 148 operates as an encoder that adds redundancy (e.g., parity bits) to the encryption-key data received from key-management appliance 142 and then applies the resulting stream of FEC-encoded data to DSP 152. In the receive direction, PL encoder/decoder 148 operates as a decoder that uses the data redundancy to correct any possible errors in the encryption-key data received from DSP 152.

DSP 152 is configured to perform the data processing that enables transmission and reception of data over M guided modes of optical fiber 180 corresponding to carrier wavelength $\lambda_q$. In the transmit direction, DSP 152 operates to: (i) parallelize the FEC-encoded stream of encryption-key data received from PL encoder/decoder 148 to generate the corresponding M parallel data streams; (ii) use the operative constellation to convert each of the M parallel data streams into a corresponding stream of constellation symbols; and (iii) apply the resulting M streams of constellation symbols to optical front-end module 158. In the receive direction, DSP 152 operates to: (i) perform M×M MIMO processing to de-convolve the M streams of digital samples corresponding to the M SDM optical signals received by optical front-end module 158 at carrier wavelength $\lambda_q$ through optical fiber 180; (ii) map the digital samples of each of the M de-convolved streams onto the operative constellation to generate M corresponding parallel data streams; and (iii) serialize the M parallel data streams to generate the corresponding FEC-encoded stream of encryption-key data for PL encoder/decoder 148.

Optical front-end module 158 can be a conventional multi-channel optical transceiver configured to handle inter-conversion of optical and electrical signals corresponding to different spatial modes of optical fiber 180. In the transmit direction, optical front-end module 158 operates to perform electrical-to-optical (E/O) conversion of the M streams of constellation symbols received from DSP 152 into the corresponding M modulated optical signals, each having the carrier wavelength $\lambda_q$. In the receive direction, optical front-end module 158 operates to perform optical-to-electrical (O/E) conversion of the M modulated optical signals having carrier wavelength $\lambda_q$, received via the corresponding M spatial modes of optical fiber 180, into the M corresponding streams of digital samples for DSP 152. In an example embodiment, optical front-end module 158 may include one or more of the following components: (i) a laser configured to generate the carrier wavelength $\lambda_q$; (ii) a plurality of optical modulators and the corresponding electrical drive circuits; (iii) one or more digital-to-analog converters (DACs); (iv) one or more analog-to-digital converters (ADCs); (v) an optical local-oscillator source; (vi) one or more optical-signal mixers, e.g., optical hybrids; (vii) a plurality of light detectors, e.g., photodiodes, etc. (none of which components is explicitly shown in FIG. 1). A person of ordinary skill in the pertinent art will readily understand how to make and use optical front-end module 158 using these and/or other suitable device components.

Optical transceiver 110 can be a conventional optical transceiver configured to use a carrier wavelength $\lambda_1$ at which optical fiber 180 is a single-mode fiber. In an example embodiment, optical transceiver 110 comprises a data framer 112, an encryption encoder/decoder 116, a PL encoder/decoder 120, a transmit/receive DSP 124, and an optical front-end module 128.

In the transmit direction, optical transceiver 110 can operate, for example, as follows. Data framer 112 operates to assemble data blocks received from various client devices into one or more data frames. Encryption encoder/decoder 116, functioning as an encoder, operates to: (i) parse each data frame into a respective set of plaintext messages m; and (ii) apply the encryption key(s) 144 received from key-management appliance 142 to each of the plaintext messages m to generate a corresponding set of encrypted messages d. PL encoder/decoder 120, functioning as an encoder, operates to apply an FEC code to convert each encrypted message d into a corresponding codeword C. DSP 124 then uses the operative constellation to convert each codeword C into a corresponding set of one or more constellation symbols S and applies the resulting stream of constellation symbols S to optical front-end module 128. Optical front-end module 128 uses the stream of constellation symbols S received from DSP 124 to modulate, in a conventional manner, a carrier wave having the carrier wavelength $\lambda_1$, thereby generating a corresponding modulated optical signal for transmission through optical fiber 180.

In the receive direction, optical transceiver 110 can operate, for example, as follows. Optical front-end module 128 detects a modulated optical signal received through optical fiber 180 to generate a corresponding electrical digital signal, the digital samples of which represent estimates of the corresponding constellation symbols S used by the remote optical transmitter in the process of generating the received modulated optical signal. DSP 124 uses the operative constellation to convert the digital samples received from optical front-end module 128 into information words, each of which is an estimate of the corresponding codeword C. PL encoder/decoder 120, functioning as a decoder, operates to: (i) apply the operative FEC code to correct any errors in the information words received from DSP 124, thereby recovering the original codewords C, and (ii) convert each of the recovered codewords C into a corresponding encrypted message d. Encryption encoder/decoder 116, functioning as a decoder, operates to: (i) apply the encryption key(s) 144 received from key-management appliance 142 to each of the encrypted messages d to recover the corresponding plaintext messages m and (ii) combine the recovered plaintext messages m to reconstruct the corresponding data frame. Data framer 112 then operates to: (i) disassemble each of the data frames into a corresponding set of data blocks and (ii) direct each of the data blocks to an appropriate client device.

In an example embodiment, optical transceiver 110 can be configured to operate at a relatively high speed compared to that of optical transceiver 140. For example, when optical fiber 180 is implemented using the commercially available SMF-28 fiber, optical transceiver 110 can be configured to use the carrier wavelength $\lambda_1$=1550 nm, dual-polarization quadrature-amplitude modulation (DP-QAM), and an optical-line rate of 100 Gbit/s. At the same time, optical transceiver 140 can be configured to use the carrier wavelength $\lambda_q$ in the range between 600 nm and 800 nm, a quadrature-phase-shift-keying (QPSK) constellation, and an optical-line rate of 1 Gbit/s.

In some embodiments, optical transceiver 110 can be replaced by a suitable optical transmitter or by a suitable optical receiver. In such embodiments, the resulting optical transceiver 100 supports only unidirectional transmission of payload data. Alternatively, either the receiver functionality or the transmitter functionality of optical transceiver 110 can be disabled to convert optical transceiver 110 into an optical transmitter or an optical receiver.

In some embodiments, optical transceiver 110 can be replaced by a suitable optical SDM transceiver. In such embodiments, the carrier wavelength $\lambda_1$ is selected such that, at this wavelength, optical fiber 180 supports a desired number N of guided (e.g., LP) modes, where N is an integer greater than one. In some embodiments, N<M.

Figure 2:
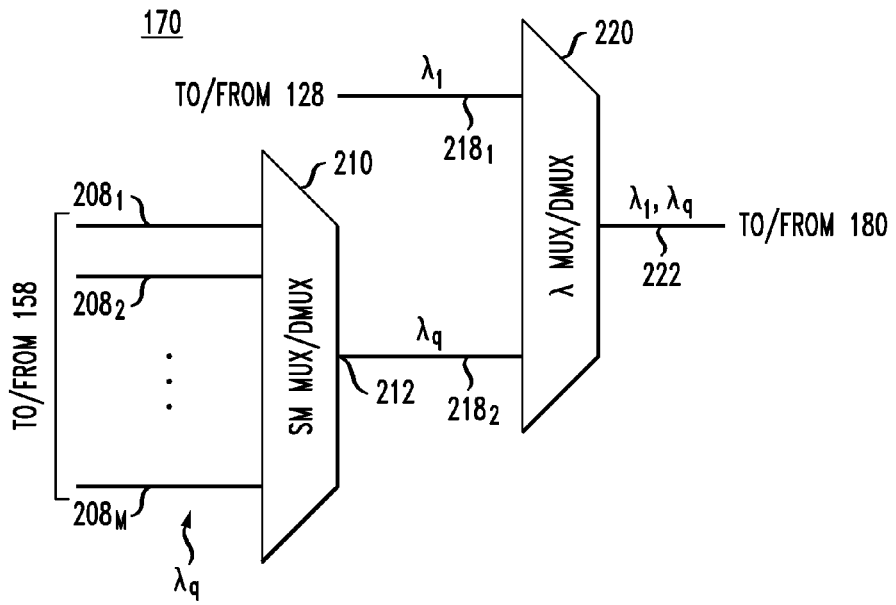
FIG. 2 shows a block diagram of an optical multiplexer/de-multiplexer that can be used in the multichannel optical transceiver of FIG. 1 according to an embodiment.

FIG. 2 shows a block diagram of optical MUX/DMUX 170 according to an embodiment. The locations of optical front-end modules 128 and 158 and optical fiber 180 are indicated in FIG. 2 to more-clearly indicate the relationship between the devices shown in FIGS. 1 and 2. Optical MUX/DMUX 170 operates as an optical multiplexer for optical signals flowing from optical front-end modules 128 and 158 to optical fiber 180. Optical MUX/DMUX 170 operates as an optical demultiplexer for optical signals flowing from optical fiber 180 to optical front-end modules 128 and 158.

Optical MUX/DMUX 170 comprises a spatial-mode (SM) MUX/DMUX 210 and a wavelength MUX/DMUX 220 connected as indicated in FIG. 2. SM MUX/DMUX 210 has M ports $208_1$-$208_M$ at one side thereof and a common port 212 at the other side thereof. Wavelength MUX/DMUX 220 has wavelength ports $218_1$ and $218_2$ at one side thereof and a common port 222 at the other side thereof. Each of the M ports $208_1$-$208_M$ is connected to a respective optical input/output (I/O) port of optical front-end module 158. The wavelength port $218_1$ is connected to an optical I/O port of optical front-end module 128. The common port 212 is connected to the wavelength port $218_2$. The common port 222 is connected to optical fiber 180.

In the transmit direction, SM MUX/DMUX 210 operates to spatially shape (e.g., phase and intensity filter) the modulated optical signals applied to the M ports $208_1$-$208_M$ by optical front-end module 158 to cause each of the resulting spatially shaped signals to have a transverse electric-field distribution that substantially matches the electric-field distribution of the corresponding guided (e.g., LP) mode of optical fiber 180. SM MUX/DMUX 210 then combines the spatially shaped signals while preserving the electric-field distributions, and applies the resulting combined optical signal to the common port 212. Since each of the modulated optical signals applied to the M ports $208_1$-$208_M$ by optical front-end module 158 has carrier wavelength $\lambda_q$, the combined optical signal at the common port 212 also has carrier wavelength $\lambda_q$.

Wavelength MUX/DMUX 220 receives the modulated optical signal generated by optical front-end module 128 at the wavelength port $218_1$. Recall that this modulated optical signal has carrier wavelength $\Delta_1$. Wavelength MUX/DMUX 220 receives the combined optical signal generated by SM MUX/DMUX 210 at the wavelength port $218_2$. Wavelength MUX/DMUX 220 operates to multiplex these signals, thereby generating a corresponding wavelength-multiplexed signal at the common port 222. In an example embodiment, wavelength MUX/DMUX 220 may include relay and/or imaging optics (not explicitly shown in FIG. 2) that images at least an aperture of the wavelength port $218_2$ and an aperture of the common port 222 onto each other in a manner that causes light corresponding to the carrier wavelength $\lambda_q$ to appropriately couple from the common port 222 into the M guided modes of optical fiber 180.

In the receive direction, wavelength MUX/DMUX 220 operates to demultiplex the wavelength-multiplexed optical signal applied to the common port 222 by optical fiber 180 by directing light corresponding to carrier wavelengths $\Delta_1$ and $\lambda_q$ to the wavelength ports $218_1$ and $218_2$, respectively. SM MUX/DMUX 210 operates to: (i) split into M portions the optical signal received at the common port 212 from the wavelength port $218_2$ and (ii) spatially shape (e.g., phase and intensity filter) each of the M portions to extract therefrom the light received via the corresponding one of the M guided modes of optical fiber 180. The resulting M modulated optical signals are then directed to optical front-end module 158 by way of ports $208_1$-$208_M$, respectively.

Example optical circuits and devices that can be used to implement SM MUX/DMUX 220 are disclosed, e.g., U.S. Pat. Nos. 8,355,638, 8,320,769, 7,174,067, and 7,639,909, and U.S. Patent Application Publication Nos. 2016/0233959 and 2015/0309249, all of which are incorporated herein by reference in their entirety. Some embodiments of optical MUX/DMUX 170 can benefit from the use of optical circuits and devices disclosed in Daniele Melati, Andrea Alippi, and Andrea Melloni, "Reconfigurable Photonic Integrated Mode (De)Multiplexer for SDM Fiber Transmission," Optics Express, 2016, v. 24, pp. 12625-12634, which is also incorporated herein by reference in its entirety.

A person of ordinary skill in the art will understand that optical MUX/DMUX 170 can be modified in a relatively straightforward manner to be compatible with at least some of the above-mentioned embodiments of optical transceiver 100, in which the single-mode optical transceiver 110 is replaced by an optical SDM transceiver. For example, one possible modification of optical MUX/DMUX 170 for this purpose is to insert, between the wavelength port $218_1$ and the optical front-end module of the corresponding optical SDM transceiver, an additional SM MUX/DMUX that is generally analogous to SM MUX/DMUX 210 but has N (instead of M) spatial-mode ports and is designed to handle the carrier wavelength $\lambda_1$ (instead of the carrier wavelength $\lambda_q$).

Figure 3:
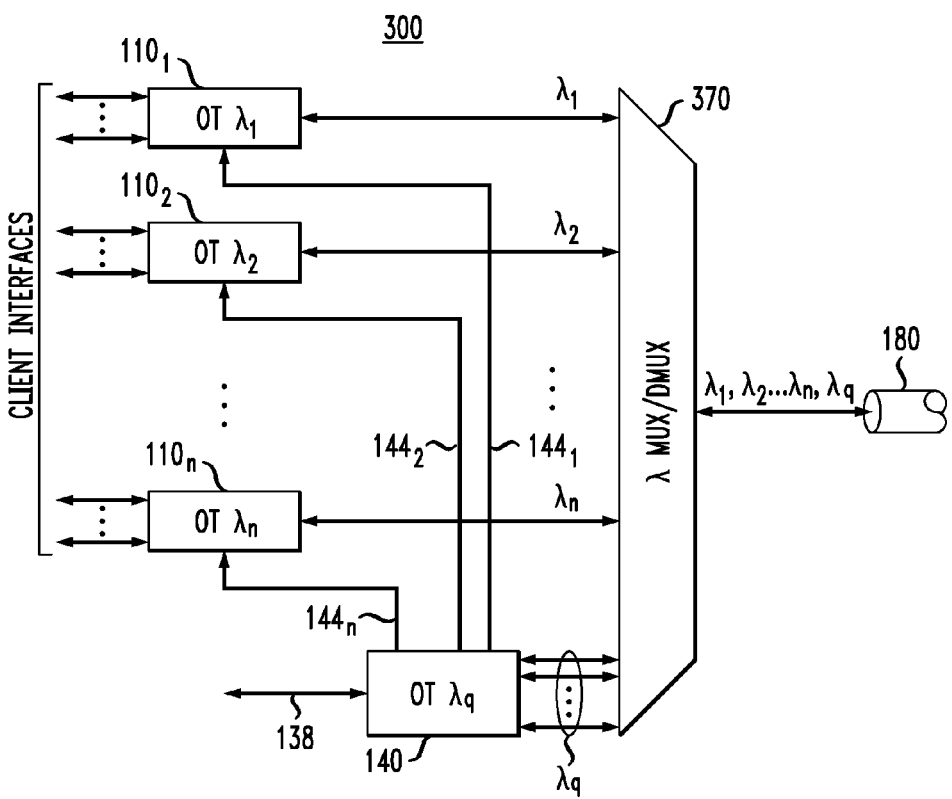
FIG. 3 shows a block diagram of a multichannel optical transceiver according to another embodiment.

FIG. 3 shows a block diagram of a multichannel optical transceiver 300 according to an alternative embodiment. Multichannel optical transceiver 300 has many of the same components as multichannel optical transceiver 100 (FIG. 1). The description of these components is therefore not repeated here. Instead, the description of multichannel optical transceiver 300 provided herein below focuses on certain differences between transceivers 100 and 300.

Multichannel optical transceiver 300 includes n instances (nominal copies) of optical transceiver (OT) 110, which are labeled in FIG. 3 using the numerals $110_1$-$110_n$, respectively, where n is an integer greater than one. Each of optical transceivers $110_1$-$110_n$ uses a different respective carrier wavelength, with these carrier wavelengths being denoted as $\lambda_1, \ldots, \lambda_n$, respectively. In an example embodiment, all of the carrier wavelengths $\lambda_1, \ldots, \lambda_n$ belong to the same spectral band, within which optical fiber 180 is a single-mode fiber.

Multichannel optical transceiver 300 further includes optical transceiver (OT) 140, wherein the key-management appliance 142 is configured to provide encryption keys, by way of control signals $144_1$-$144_n$, to optical transceivers $110_1$-$110_n$, respectively.

An optical MUX/DMUX 370 that is configured to appropriately couple optical transceivers $110_1$-$110_n$ and 140 to optical fiber 180 is generally analogous to optical MUX/DMUX 170 (FIGS. 1-2). However, optical MUX/DMUX 370 differs from optical MUX/DMUX 170 in that it includes additional wavelength ports for carrier wavelengths $\lambda_2, \ldots, \lambda_n$. In an example embodiment, optical MUX/DMUX 370 can be implemented by replacing wavelength MUX/DMUX 220 (FIG. 2) by a suitable wavelength MUX/DMUX having more wavelength ports 218.

In some other embodiments, some or all of optical transceivers $110_1$-$110_n$ can be replaced by suitable optical SDM transceivers. In such embodiments, the carrier wavelengths $\lambda_1, \ldots, \lambda_n$ may all be selected from a spectral band within which optical fiber 180 supports a desired number N of guided (e.g., LP) modes, where N is an integer greater than one. In some embodiments, N<M.

Some embodiments disclosed herein can provide one or more of the following benefits. The use of SDM and MIMO techniques to implement secure encryption-key distribution using the optical layer of the corresponding communication system can significantly streamline the encryption-key management and distribution processes and be particularly useful in networks with a relatively large number of transponders, such as in inter-datacenter metro links. Various embodiments enable the secure SDM-MIMO channel to be deployed on the same optical fiber as the conventional (e.g., insecure) channel. Given that the fiber costs are a significant CAPEX factor, especially for links having a length greater than several kilometers, the ability to reuse the primary fiber infrastructure for deploying the secure channel can be a significant cost-saver. Some embodiments provide the capability for a smooth upgrade path for the secure channel, wherein a higher level of security can be achieved by reducing the carrier wavelength $\lambda_q$ to increase the number of guided modes over which the encryption-key transmissions can be scrambled.

According to an example embodiment disclosed above in reference to FIGS. 1-3, provided is an apparatus comprising: an optical transmitter or receiver (e.g., part of 110, FIG. 1 or 3) configured to be optically coupled to an optical fiber (e.g., 180, FIG. 1 or 3), and further configured to transmit or receive optical signals having a first carrier wavelength (e.g., $\lambda_1$) at which the optical fiber supports a single guided mode; an optical transceiver (e.g., 140, FIG. 1 or 3) configured to be optically coupled to the optical fiber to transmit and receive optical signals having a second carrier wavelength (e.g., $\lambda_q$) at which the optical fiber supports a first plurality of guided (e.g., LP) modes; and an optical multiplexer (e.g., 170, FIGS. 1-2; 370, FIG. 3) configured to optically couple the optical transceiver and the optical transmitter or receiver to the optical fiber in a manner that enables the optical transceiver to transmit and receive different modulated optical signals having the second carrier wavelength by way of different respective guided modes of the optical fiber, and further enables the optical transmitter or receiver to transmit or receive the optical signals having the first carrier wavelength by way of the single guided mode of the optical fiber.

In some embodiments of the above apparatus, the optical transmitter or receiver is an optical transmitter configured to transmit the optical signals having the first carrier wavelength.

In some embodiments of any of the above apparatus, the optical transmitter or receiver is an optical receiver configured to receive the optical signals having the first carrier wavelength.

In some embodiments of any of the above apparatus, the apparatus further comprises an additional optical transceiver (e.g., 110, FIG. 1 or 3) configured to be optically coupled to the optical fiber through the optical multiplexer, and further configured to transmit and receive optical signals having the first carrier wavelength, wherein the additional optical transceiver includes the optical transmitter or receiver.

In some embodiments of any of the above apparatus, the apparatus further comprises a third optical transceiver (e.g., 110$_n$, FIG. 1 or 3) configured to be optically coupled to the optical fiber through the optical multiplexer, and further configured to transmit and receive optical signals having a third carrier wavelength (e.g., $\lambda_n$) at which the optical fiber supports a single guided mode, the third carrier wavelength being different from the first carrier wavelength.

In some embodiments of any of the above apparatus, the apparatus further comprises a third optical transceiver (e.g., 110$_n$, FIG. 1 or 3) configured to be optically coupled to the optical fiber through the optical multiplexer, and further configured to transmit and receive optical signals having a third carrier wavelength (e.g., $\lambda_n$) at which the optical fiber supports a second plurality of guided modes, the third carrier wavelength being different from the second carrier wavelength.

In some embodiments of any of the above apparatus, the second plurality of guided modes has fewer guided modes than the first plurality of guided modes (e.g., N<M). In some embodiments of any of the above apparatus, the apparatus further comprises at least a portion of the optical fiber (e.g., as indicated in FIG. 1).

In some embodiments of any of the above apparatus, the optical transceiver is configured to change the second carrier wavelength in a manner that adds one or more guided modes to the first plurality of guided modes or removes one or more guided modes from the first plurality of guided modes.

In some embodiments of any of the above apparatus, the apparatus further comprises a key-management appliance (e.g., 142, FIG. 1) operatively connected to the optical transceiver to cause the optical transceiver to transmit and receive encryption keys using the different modulated optical signals.

In some embodiments of any of the above apparatus, the optical transmitter or receiver comprises an encryption circuit (e.g., 116, FIG. 1) operatively coupled to the key-management appliance to receive therefrom (e.g., by way of 144, FIG. 1) the encryption keys and configured to perform at least one of the following: cause the optical signals transmitted by the optical transmitter or receiver to carry a set of encrypted messages (e.g., d, FIG. 1), each of the encrypted messages being encrypted using one or more of the encryption keys received from the key-management appliance; and use one or more of the encryption keys received from the key-management appliance to decrypt a set of encrypted messages (e.g., d, FIG. 1) carried by the optical signals received by the optical transmitter or receiver.

In some embodiments of any of the above apparatus, the optical multiplexer comprises: a spatial-mode multiplexer (e.g., 210, FIG. 2) having a plurality of ports (e.g., 208$_1$-208$_M$, FIG. 2) and a common port (e.g., 212, FIG. 2), the plurality of ports being connected to the optical transceiver to transmit and receive the different modulated optical signals; and a wavelength multiplexer (220, FIG. 2) having a first wavelength port (e.g., 218$_1$, FIG. 2), a second wavelength port (e.g., 218$_2$, FIG. 2), and a common port (e.g., 222, FIG. 2), the first wavelength port being connected to the optical transmitter or receiver, the second wavelength port being connected to the common port of the spatial-mode multiplexer, and the common port of the wavelength multiplexer being connectable to the optical fiber.

In some embodiments of any of the above apparatus, the apparatus further comprises one or more additional optical transceivers (e.g., 110$_2$-110$_n$, FIG. 3), each configured to be optically coupled to the optical fiber through the optical multiplexer, and further configured to transmit and receive optical signals having a different respective carrier wavelength (e.g., $\lambda_2, \ldots, \lambda_n$) at which the optical fiber supports a single guided mode; and wherein the optical multiplexer has one or more additional wavelength ports (e.g., $\lambda_2, \ldots, \lambda_n$, FIG. 3), each of the one or more additional wavelength ports being connected to a respective one of the one or more additional optical transceivers.

In some embodiments of any of the above apparatus, the apparatus further comprises a key-management appliance (e.g., 142, FIG. 1) operatively connected to the optical transceiver to cause the optical transceiver to transmit and receive encryption keys using the different modulated optical signals; and wherein each of the one or more additional optical transceivers comprises a respective encryption circuit (e.g., nominal copy of 116, FIG. 1) operatively coupled to the key-management appliance to receive therefrom (e.g., by way of a respective one of 144$_1$-144$_n$, FIG. 1) the encryption keys and configured to: cause the optical signals transmitted by a corresponding one of the one or more additional optical transceivers to carry a set of encrypted messages (e.g., d, FIG. 1), each of the encrypted messages being encrypted using one or more of the encryption keys received from the key-management appliance; and use one or more of the encryption keys received from the key-management appliance to decrypt a set of encrypted messages (e.g., d, FIG. 1) carried by the optical signals received by the corresponding one of the one or more additional optical transceivers.

In some embodiments of any of the above apparatus, the spatial-mode multiplexer is configured to: spatially shape optical signals applied to the plurality of ports by the optical transceiver to cause each of resulting spatially shaped optical signals to have a respective transverse electric-field distribution that substantially matches an electric-field distribution of a corresponding guided mode of the optical fiber; generate a combined optical signal by combining the resulting spatially shaped optical signals in a manner that preserves the respective transverse electric-field distributions; and apply the combined optical signal, by way of the common port of the spatial-mode multiplexer, to the second wavelength port of the wavelength multiplexer.

In some embodiments of any of the above apparatus, the spatial-mode multiplexer is configured to: split into a plurality of portions an optical signal received at the common port thereof from the second wavelength port of the wavelength multiplexer; spatially shape each of the portions to extract therefrom light received via a corresponding one of the first plurality of guided modes of the optical fiber; and direct the light, by way of the plurality of ports, to the optical transceiver.

According to another example embodiment disclosed above in reference to FIGS. 1-3, provided is an apparatus comprising: a first optical transceiver (e.g., 110, FIG. 1 or 3) configured to be optically coupled to an optical fiber (e.g., 180, FIG. 1 or 3), and further configured to transmit and receive optical signals having a first carrier wavelength (e.g., $\lambda_i$) at which the optical fiber supports a first number (e.g., N) of guided (e.g., LP) modes, the first number being greater than one; a second optical transceiver (e.g., 140, FIG. 1 or 3) configured to be optically coupled to the optical fiber to transmit and receive optical signals having a second carrier wavelength (e.g., $\lambda_q$) at which the optical fiber supports a second number (e.g., M) of guided (e.g., LP) modes, the second number being greater than the first number (e.g., M>N); an optical multiplexer (e.g., 170, FIGS. 1-2; 370, FIG. 3) configured to optically couple the first optical transceiver and the second optical transceiver to the optical fiber in a manner that enables the first optical transceiver to transmit and receive different modulated optical signals having the first carrier wavelength by way of different respective guided modes of the optical fiber corresponding to the first wavelength, and further enables the second optical transceiver to transmit and receive different modulated optical signals having the second carrier wavelength by way of different respective guided modes of the optical fiber corresponding to the first wavelength; and a key-management appliance (e.g., 142, FIG. 1) operatively connected to the second optical transceiver to cause the second optical transceiver to transmit and receive encryption keys using the different modulated optical signals having the second carrier wavelength; and wherein the first optical transceiver comprises an encryption circuit (e.g., 116, FIG. 1) operatively coupled to the key-management appliance to receive therefrom (e.g., by way of 144, FIG. 1) the encryption keys and configured to: cause the optical signals transmitted by the first optical transceiver to carry a set of encrypted messages (e.g., d, FIG. 1), each of the encrypted messages being encrypted using one or more of the encryption keys received from the key-management appliance; and use one or more of the encryption keys received from the key-management appliance to decrypt a set of encrypted messages (e.g., d, FIG. 1) carried by the optical signals received by the optical transmitter or receiver.

In some embodiments of the above apparatus, the first optical transceiver is configured to change the first carrier wavelength in a manner that changes the first number of guided modes.

In some embodiments of any of the above apparatus, the second optical transceiver is configured to change the second carrier wavelength in a manner that changes the second number of guided modes.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   an optical transmitter or receiver configured to be optically coupled to an optical fiber, and further configured to transmit or receive optical signals having a first carrier wavelength at which the optical fiber supports a single guided mode;
   an optical transceiver configured to be optically coupled to the optical fiber to transmit and receive optical signals having a second carrier wavelength at which the optical fiber supports a first plurality of guided modes; and
   an optical multiplexer configured to optically couple the optical transceiver and the optical transmitter or receiver to the optical fiber in a manner that enables the optical transceiver to transmit and receive different modulated optical signals having the second carrier wavelength by way of different respective guided modes of the optical fiber, and further enables the optical transmitter or receiver to transmit or receive the optical signals having the first carrier wavelength by way of the single guided mode of the optical fiber; and
   wherein the optical multiplexer comprises:
      a spatial-mode multiplexer having a plurality of ports and a common port, the plurality of ports being connected to the optical transceiver to transmit and receive the different modulated optical signals; and
      a wavelength multiplexer having a first wavelength port, a second wavelength port, and a common port, the first wavelength port being connected to the optical transmitter or receiver, the second wavelength port being connected to the common port of the spatial-mode multiplexer, and the common port of the wavelength multiplexer being connectable to the optical fiber.

2. The apparatus of claim 1, wherein the optical transmitter or receiver is an optical transmitter configured to transmit the optical signals having the first carrier wavelength.

3. The apparatus of claim 1, wherein the optical transmitter or receiver is an optical receiver configured to receive the optical signals having the first carrier wavelength.

4. The apparatus of claim 1, further comprising an additional optical transceiver configured to be optically coupled to the optical fiber through the optical multiplexer, and further configured to transmit and receive optical signals having the first carrier wavelength, wherein the additional optical transceiver includes the optical transmitter or receiver.

5. The apparatus of claim 4, further comprising a third optical transceiver configured to be optically coupled to the optical fiber through the optical multiplexer, and further configured to transmit and receive optical signals having a third carrier wavelength at which the optical fiber supports a single guided mode, the third carrier wavelength being different from the first carrier wavelength.

6. The apparatus of claim 4, further comprising a third optical transceiver configured to be optically coupled to the optical fiber through the optical multiplexer, and further configured to transmit and receive optical signals having a third carrier wavelength at which the optical fiber supports a second plurality of guided modes, the third carrier wavelength being different from the second carrier wavelength.

7. The apparatus of claim 6, wherein the second plurality of guided modes has fewer guided modes than the first plurality of guided modes.

8. The apparatus of claim 1, wherein the optical transceiver comprises a key-management appliance operatively connected to cause the optical transceiver to transmit and receive encryption keys using the different modulated optical signals.

9. The apparatus of claim 8, wherein the optical transmitter or receiver comprises an encryption circuit operatively coupled to the key-management appliance to receive therefrom the encryption keys, and configured to perform at least one of the following:
   cause the optical signals transmitted by the optical transmitter or receiver to carry a set of encrypted messages, each of the encrypted messages being encrypted using one or more of the encryption keys received from the key-management appliance; and
   use one or more of the encryption keys received from the key-management appliance to decrypt a set of encrypted messages carried by the optical signals received by the optical transmitter or receiver.

10. The apparatus of claim 1, further comprising one or more additional optical transceivers, each configured to be optically coupled to the optical fiber through the optical multiplexer, and further configured to transmit and receive optical signals having a different respective carrier wavelength at which the optical fiber supports a single guided mode; and
    wherein the wavelength multiplexer has one or more additional wavelength ports connected to the common port, each of the one or more additional wavelength ports being connected to a respective one of the one or more additional optical transceivers.

11. The apparatus of claim 10, wherein the optical transceiver comprises a key-management appliance operatively connected to cause the optical transceiver to transmit and receive encryption keys using the different modulated optical signals; and wherein each of the one or more additional optical transceivers comprises a respective encryption circuit operatively coupled to the key-management appliance to receive therefrom the encryption keys and configured to:
  cause the optical signals transmitted by a corresponding one of the one or more additional optical transceivers to carry a set of encrypted messages, each of the encrypted messages being encrypted using one or more of the encryption keys received from the key-management appliance; and
  use one or more of the encryption keys received from the key-management appliance to decrypt a set of encrypted messages carried by the optical signals received by the corresponding one of the one or more additional optical transceivers.

12. The apparatus of claim 1, wherein the spatial-mode multiplexer is configured to:
  spatially shape optical signals applied to the plurality of ports by the optical transceiver to cause each of resulting spatially shaped optical signals to have a respective transverse electric-field distribution that substantially matches an electric-field distribution of a corresponding guided mode of the optical fiber;
  generate a combined optical signal by combining the resulting spatially shaped optical signals in a manner that preserves the respective transverse electric-field distributions; and
  apply the combined optical signal, by way of the common port of the spatial-mode multiplexer, to the second wavelength port of the wavelength multiplexer.

13. The apparatus of claim 1, wherein the spatial-mode multiplexer is configured to:
  split into a plurality of portions an optical signal received at the common port thereof from the second wavelength port of the wavelength multiplexer;
  spatially shape each of the portions to extract therefrom light received via a corresponding one of the first plurality of guided modes of the optical fiber; and
  direct the light, by way of the plurality of ports, to the optical transceiver.

* * * * *